Jan. 17, 1967    T. J. COLEMAN ETAL    3,298,724
QUICK DISCONNECT MECHANISMS

Filed May 20, 1964    2 Sheets-Sheet 1

INVENTORS
THEODORE J. COLEMAN
BY JOHN M. MAXWELL

WILSON, SETTLE & CRAIG
ATTORNEYS

Jan. 17, 1967 T. J. COLEMAN ETAL 3,298,724
QUICK DISCONNECT MECHANISMS
Filed May 20, 1964 2 Sheets-Sheet 2
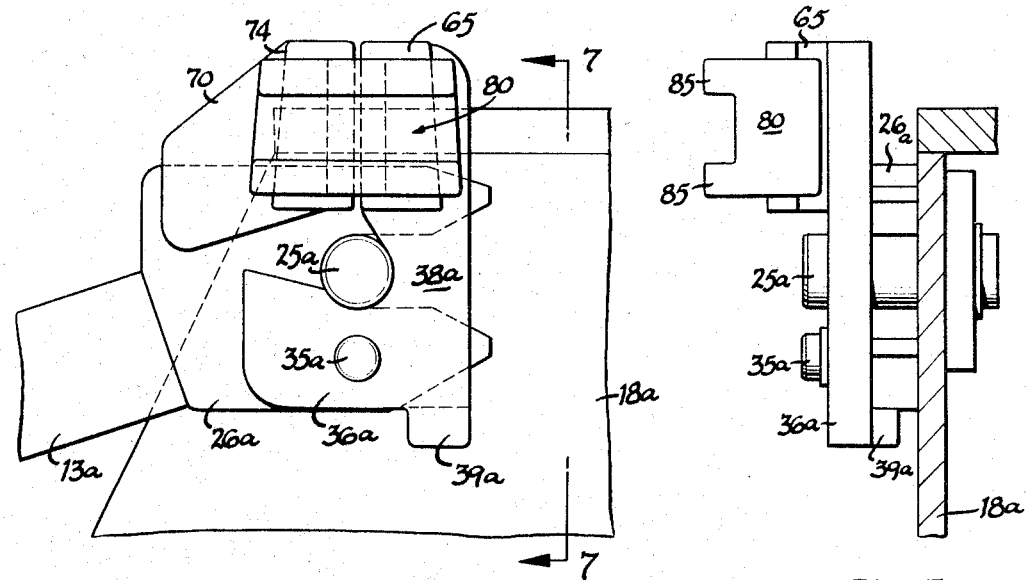
FIG. 6
FIG. 7
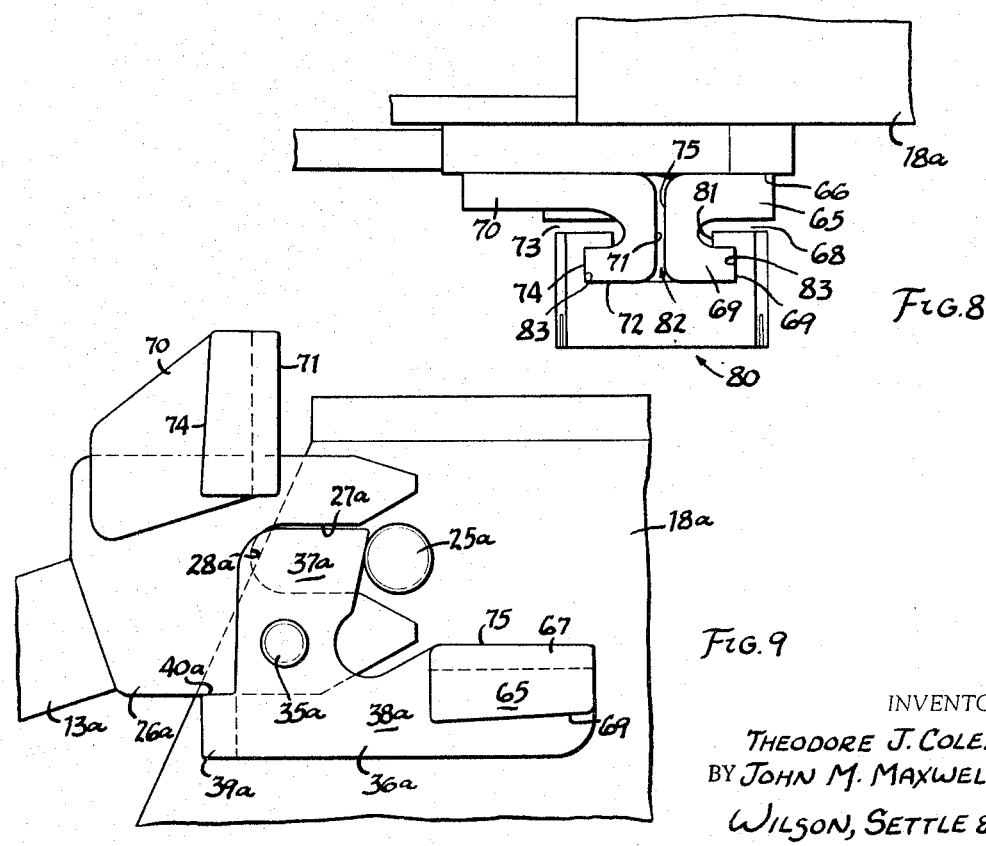
FIG. 8
FIG. 9
INVENTORS
THEODORE J. COLEMAN
BY JOHN M. MAXWELL
WILSON, SETTLE & CRAIG
ATTORNEYS United States Patent Office 3,298,724
Patented Jan. 17, 1967

3,298,724
QUICK DISCONNECT MECHANISMS
Theodore J. Coleman and John M. Maxwell, Burlington, Iowa, assignors to J. I. Case Company, Racine, Wis., a corporation of Wisconsin
Filed May 20, 1964, Ser. No. 368,950
4 Claims. (Cl. 287—189.36)

The present invention relates to an implement-prime mover coupling and more particularly to a coupling for separably connecting an implement to a tractor or the like, the mechanism being actuated upon relative implement-tractor movement and without the utilization of extraneous actuating mechanism.

With the continued development of tractor-mounted implements and the proliferation of such implements intended for integration with the tractor as a prime mover, the problem of quickly, easily and economically coupling the implement and tractor into assembly has received a great deal of attention. The problem becomes particularly acute in connection with larger implements, such as back-hoes, trenchers and the like, which must be secured to the tractor through a tractor-mounted sub-frame. Since such implements are not actuated from the tractor hitch linkage, a rigid connection between the tractor and the implement is desired, this connection being capable of sustaining not only the substantial implement weight but also being capable of resisting those reaction forces imposed upon the tractor during implement actuation.

Various complicated attaching arrangements have been proposed in the prior art, such attaching mechanisms usually requiring an additional hydraulic cylinder or a movable sub-frame interposed between the tractor mounted frame and the implement frame. The expense of such devices, their operational complexities and the additional service requirements imposed by the attaching mechanisms will be obvious.

The present invention now provides a new, extremely simple, completely self-contained coupling mechanism capable of securing even the largest implements into rigid and accurate assembly with a prime mover. No extraneous actuating mechanism whatsoever is required, the entire attaching procedure merely requires alignment between the implement and the tractor and relative movement therebetween the two elements. Further, a simple, frictional lock is provided to maintain the two elements in assembly, once the attachment has been completed.

Structurally, the present invention incorporates a plurality of transversely projecting attachment pins on one element of the implement-tractor combination, and a corresponding number of equivalently spaced receiving recesses on the other element of the combination. Adjacent the recesses and movable relative thereto are pivotally mounted locking levers, these levers being normally gravitationally positioned to block the entrance to the recesses and contactable by the attachment pins. Contact between the pins and the levers, as the pins enter the recesses upon relative tractor-implement movement, pivots the pins to position a locking portion of the levers behind the pin as the pin enters the recess.

When the pin is fully bottomed in its recess, the corresponding lever abuts a fixed abutment on the other element of the combination, and a locking saddle is manually positioned over the abutments to retain them in their locked positions. Thus, the locking saddle secures the lever against displacement from its locked position, and removal of the saddle is a prerequisite to separation of the implement and the tractor.

Upon saddle removal, relative movement of the implement and the tractor cams the levers from their locking position to release the implement from the tractor.

The specific contour of the locking levers, the overbalancing of the levers so that they are always in open position to receive the pin, and the correlation of the abutments for receiving the locking saddles are critical details contributing to operability of the overall connecting structure.

It is, therefore, an important object of the present invention to provide an implement-prime mover coupling actuatable upon relative implement-prime mover movement without the utilization of extraneous actuating mechanisms.

Another important object of this invention is the provision of an improved implement-tractor connection for rigidly securing an implement to a tractor-mounted frame at a plurality of spaced points and incorporating locking levers actuated upon such relative movement for either coupling or uncoupling the implement and tractor.

It is a further important object to provide an implement-tractor coupling wherein a plurality of attachment pins abut locking levers during relative tractor-implement movement to actuate the levers to and from a locking position at which a locking saddle is utilized to separably connect the tractor and the implement.

Yet another, and no less important, object of this invention is the provision of a means for interconnecting a tractor and an implement in releasably clamped position and wherein fixed mounting pins abut pivotally movable locking elements upon relative tractor-implement movement to actuate the locking elements toward a locking position when the relative tractor-implement movement occurs in one direction, and from such locking relation when the relative movement is in the other direction, frictionally engageable locking saddles being utilized to retain the locking elements in their locking positions after relative movement has been completed in the one direction.

Other objects of this invention will appear in the following description and appended claims, reference being had to the accompanying drawings forming a part of this specification wherein like reference characters designate corresponding parts in the several views.

On the drawings:

FIGURE 6 is a view similar to FIGURE 5 but illustrating a different form of couplings;

FIGURE 7 is a sectional view taken along the plane 7—7 of FIGURE 6;

FIGURE 8 is a plan view of the coupling illustrated in FIGURE 6;

FIGURE 9 is a view similar to FIGURE 2 but illustrating that embodiment of the invention of FIGURE 6.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
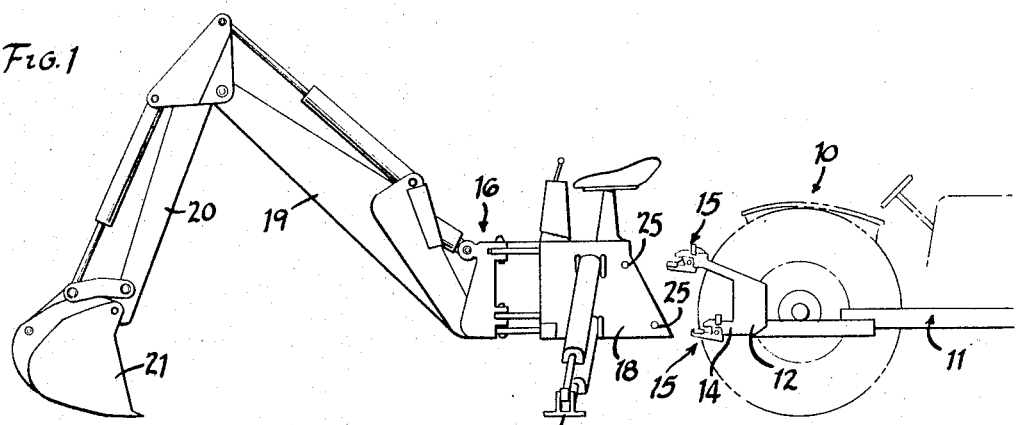
FIGURE 1 is a side elevational view, somewhat schematic in nature, illustrating a coupling of the present invention utilized to interconnect a tractor and a back-hoe or similar implement.

As shown on the drawings:

In FIGURE 1, reference numeral 10 refers generally to a tractor or other prime mover provided with an implement-attaching frame 11. Such a frame is conventionally attached to the body of the tractor to extend along the wheel base thereof, the frame terminating at its rear end in a vertically extending, massive attachment bracket 12 having rearwardly projecting arms, such as upper arms 13 and lower arms 14, these arms bearing at their rearmost extremeties attachment elements 15 of the present invention, as will be hereinafter more fully described in detail.

The tractor or prime mover 10 is to be coupled to an implement 16. In the particular embodiment of FIGURE 1 of the drawings, the implement 16 is a back-hoe which is supported in an upright position by means of a pair of transversely spaced stabilizer feet 17 carried by the fixed back-hoe frame 18, the frame 18 carrying a rearwardly projecting boom 19 and a dipper stick 20 to which is attached a digging bucket 21, the bucket 21 contacting the ground in triangulated relationship with the stabilizer feet 17 to retain the back-hoe 16 in its illustrated upright position.

The back-hoe frame 18 carries a plurality of laterally projecting, cylindrical attachment pins 25. Although only two such pins, and only two attachment mechanisms 15 appear in FIGURE 1 of the drawings, it will be appreciated that at least three, and preferably four, such pins are provided, the two illustrated attaching means 15 and the pins 25 being duplicated on the other side of the illustration of FIGURE 1.

Figure 2:
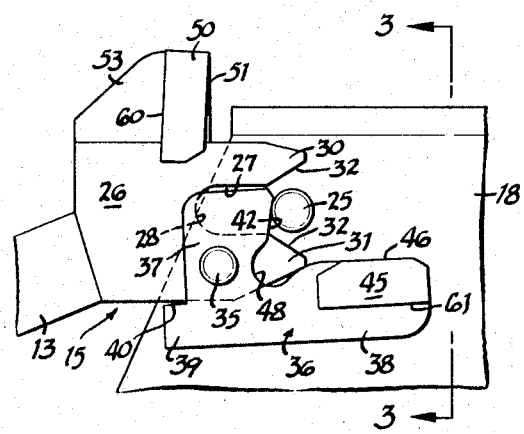
FIGURE 2 is an enlarged fragmentary elevational view illustrating the relative position of the coupling elements prior to their interconnection.
Figure 3:
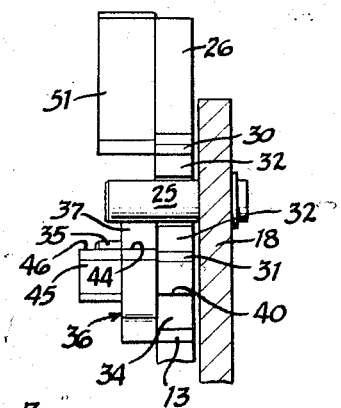
FIGURE 3 is a vertical sectional view taken along the plane 3—3 of FIGURE 2.

As illustrated in FIGURES 1 and 2 of the drawings the pins 25 project laterally from the frame 18 of the implement 16 in horizontally and vertically spaced relation, this same spatial relationship exists with the attaching elements 15, i.e., the elements 15 are similarly spaced vertically and horizontally.

In FIGURES 2 through 9 of the drawings, only that attaching means located upon the upper arm 13 is illustrated and only the upper pin 25 is shown, for clarity of illustration.

The attachment means 15 comprises a bracket 26 rigidly secured to the arm 13 and having a rearwardly opening notch 27 aligned with the attachment pin 25 and of a vertical extent slightly greater than the diameter of the pin, the notch 27 being rounded at its forward closed end, as at 28, to snugly abut the exterior periphery of the pin 25. On either side of the notch 27, the bracket 26 defines an upper guide finger 30 and a lower guide finger 31, these fingers having confronting, rearwardly opening inclined guide surfaces 32, respectively, for vertically guiding the pins 25 toward the notch 27 upon relative tractor-implement movement. These rearwardly divergent surfaces 32 thus tend to center the pin 25 with respect to the bracket 26 and, specifically, with respect to the notch 27.

Carried by the bracket 26 at a position located beneath the notch 27 is a fixed pivot pin indicated generally at 35, this pin projecting laterally from the bracket to be axially parallel to and axially remote from the attachment pin 25 on the frame 18 when the pin is outside the notch 27.

Pivotally supported on the pin 35 for pivotal movement relative to the bracket 26 is a locking lever, indicated generally at 36, this lever comprising angularly regulated arms 37, 38. The lever 36 is also provided with an inturned stop 39 having an upper stop surface 40 abuttable with the under surface of the bracket 26 to gravitationally retain the locking lever in its position of FIGURE 2. The arm 37 of the lever projects upwardly alongside the notch 27 when the lever is in its free gravitationally stabilized condition of FIGURE 2, the arm having a rearwardly and downwardly inclined surface 42 positioned in the path of movement of the pin 25 into the notch 27 so as to be contacted by the pin 25 upon such relative movement as the pin 25 enters the notch.

The arm 38 is provided with a free, upwardly directed surface 44 (FIGURE 3), the arm 38 also carrying an abutment 45 projecting laterally from the arm (FIGURE 3), the abutment 45 having a surface 46 co-planar with the arm surface 44.

Figure 4:
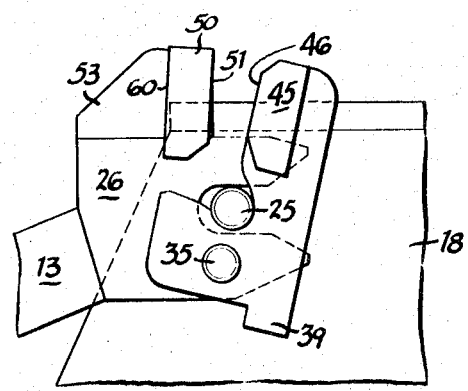
FIGURE 4 is a view similar to FIGURE 2 but illustrating the coupling elements during the relative tractor-implement movement.
Figure 5:
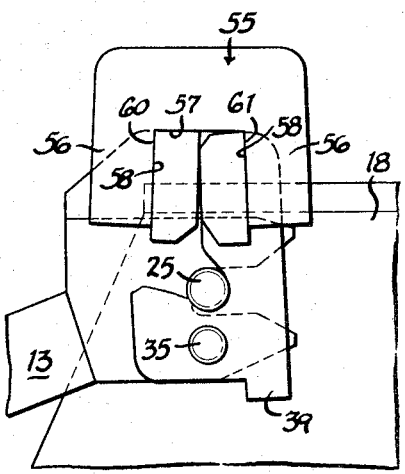
FIGURE 5 is a view similar to FIGURES 2 and 4 but illustrating the coupling elements in their final locked position.

As illustrated in FIGURES 1, 4 and 5, the arms 37, 38 are angularly related to lie substantially normal to one another. Intermediate the surfaces 42, 44 of the arm is a locking recess 48, this recess being arcuate and having a diameter substantially the same as the diameter of the pin 25.

Also carried by the bracket 26 is an upstanding abutment 50 having a substantially vertical abutment face 51 vertically aligned with the face 46 of the lever arm 38, the abutment 50 being strengthened by an upstanding reinforcing web 53 mounted on the bracket 26.

The operation of the locking mechanism will be readily apparent from a comparison of FIGURES 2, 4 and 5 of the drawings. As will be seen from FIGURE 2, initial relative displacement of the tractor pin and the implement 16 from their positions of FIGURE 1 will bring the bracket 26 and the lever 36 into the operative relationship relative to the pin 25, as illustrated in FIGURE 2, wherein the pin 25 abuts the leading edge 42 of the lever arm 38. The lever 36 is gravitationally overbalanced to its illustrated position of FIGURE 2 by the arm 38 and the abutment 45 carried thereby. The stop surface 40, engaging the under surface of the bracket 26, retains the locking lever 36 in this position.

As the frame 18 and the bracket 26 continue their relative movement, the pin 25 contacting the surface 42 forces the lever 36 to pivot about the pivot pin 35 in a counterclockwise direction. The location of the recess 48 is such that relative rotational movement of the arm 36 will elevate the recess in an arcuate path about the pin 35 until such time as the recess freely receives therein the pin 25.

The pin 25 and the pivot pin 35 move relative to one another in only a horizontal plane and, when the pin 25 is seated in the notch 27, the pins 25, 35 are vertically aligned. The center-to-center distance between the pin 35 and the notch 27 is substantially the same as the center-to-center distance between the pin 35 and the recess 48. These relationships, together with the inclined guide face 42 of the lever 36 result in the smooth and effective transition from the position of FIGURE 2 to the position of FIGURE 4.

As the lever 36 is rotated in this fashion, the abutment 45 approaches the abutment 50 until, finally, the position of FIGURE 5 is attained. At this position, the face 46 of the abutment 45 contacts the face 51 of the abutment 50 and further rotative movement of the lever 36 is prevented by such abutment.

At this time, the surface 48 defining the recess in the locking lever 36 closes the open rear side of the notch 27, so that the locking lever 36 fully confines the pin 25 in a rearward direction, while that surface 28 of the bracket 26 defining the forward end of the notch 27 further contacts the pin 25. Thus, the pin is securely locked in position between the bracket 26 and the pin-confining lever arm 38.

To fixedly secure the lever 36 in its locked position, a U-shaped locking saddle 55 (FIGURE 5) is utilized, this locking saddle having a pair of depending projections 56 defining therebetween a downwardly opening notch having a top surface 57 abutting the upper surfaces of the abutments 45, 50 and side surfaces 58 contacting the surface 60 of the abutment 50 and the surface 61 of the abutment 45. It will be noted that the abutments 50 and 45 are oriented so that abutment between the surfaces 46, 51 thereof will result in a slight relative inclination of the surfaces 60, 61, this inclination of the surfaces 60, 61 defining a relative upward taper or "draft" of slight but definite magnitude, i.e., on the order of three to six (3° to 6°) degrees from parallel. The surfaces 58 of the locking saddle 55 are correspondingly tapered. This taper or "draft" in the surfaces 58 and between the surfaces 60, 61 is provided to accommodate their ready telescopic movement of the locking saddle 55 downwardly to the locked position of FIGURE 5 and upwardly to a releasing position.

Thus, the locking saddle 55 secures the pin 25 in the notch 27 by preventing arcuate, clockwise displacement of the locking lever 36 once the locking saddle has been manually telescoped over the abutments 45, 50. If desired, such telescopic movement may be facilitated by utilization of an appropriate tool, such as a hammer. Of course, once it is desired to separate the implement frame 18 and the tractor mounted frame 11, it is only necessary to remove the locking saddle 55, as by striking the under surface of the saddle to drive the same vertically upwardly, and to actuate the tractor 10 away from the implement 16, thus pulling the frame arm 13 to the left from its assembled position of FIGURE 5. The locking pin 25 being stationary with the implement, will force the locking lever 36 to travel in a clockwise direction toward and to its illustrated position of FIGURE 2 as tractor-implement separation occurs.

In that embodiment of the invention illustrated in FIGURES 6 through 9, a different form of locking mechanism is illustrated. Of course, that form of the invention illustrated in FIGURES 6 through 9 is functionally the same as that illustrated in FIGURES 1 through 5, although the embodiments are somewhat different in structure.

As illustrated in FIGURE 9 of the drawings, reference numerals identical to those utilized in FIGURES 1 through 5 refer to identical portions of the mechanism, the suffix 'a' being added to the reference numerals with respect to FIGURES 6 through 9.

From FIGURE 9 it will be seen that the frame arm 13a, the bracket 26a, the notch 27a and the arcuate notch surface 28a are substantially the same as those heretofore described. The pins 25a and the frame 18a mounted upon the implement are also substantially identical. A pivot pin 35a pivotally supports a locking lever 36a, the lever including an upwardly directed arm 37a and a lower horizontally directed arm 38a.

The locking lever 38a carries a laterally displaced stop 39a having an upper surface 40a abutting the under surface of the bracket 26a.

The lower or horizontal arm 38a carries an abutment, indicated generally at 65, this abutment being secured to the outer face 66 of the arm 38a in face-to-face abutment therewith. The abutment 65 has an extreme outwardly deflected flange 67 which lies generally parallel to the arm 38a, the inner portion of the abutment 65 and the outer flange 67 defining therebetween a vertical notch 68 opening toward the right, as seen in FIGURES 6 and 8. The terminal edge 69 of this flange 67 is tapered in a vertical plane, as above described in connection with the surface 61 of the abutment 45. A similar abutment 70 is provided on the bracket 26a, this abutment having a rear face 71 merging into a reversely turned flange 72, similar to the flange 67, to define a forwardly opening notch 73 identical with the notch 68. The terminal forwardly directed face 74 of the flange 72 is tapered similarly to the taper of the surface 69 heretofore described.

The operation of the device of FIGURES 6 through 9 is substantially the same as the operation of the mechanism of FIGURES 1 through 5 heretofore described. Thus, relative longitudinal displacement of the frame 18a and the bracket 26a will rotate the lever 36a from the position of FIGURE 9 to the position of FIGURE 6, such relative motion being stopped when the pins 25a bottom in the recesses 27a.

As illustrated in FIGURE 6 of the drawings, it is not necessary that the adjacent surfaces 71, 75 of the abutments 65, 60 abut one another; it is only necessary that the abutments be positioned in juxtaposed fashion, sufficiently close that the locking saddle 80 (FIGURES 6, 7 and 8) be telescopically received by the abutments 65, 70.

As illustrated in FIGURES 6 through 8, a locking saddle 80 is provided with an opening 81 on the inner side thereof, providing ingress to a re-entrant vertical slot, indicated generally at 82, this slot including laterally spaced recesses 83 to either side of the opening 81 and adapted to receive the flanges 67, 72 of the abutments 65, 70.

Thus, vertical downward movement of the locking saddle 80 interlocks the saddle with the flanges 67, 72, the recesses being tapered in a manner complementary to the tapered surfaces 69, 74 of the bosses to accommodate entry of the locking saddle over the abutments. The locking saddle is provided with a pair of vertically spaced, laterally projecting embossments 85 to accommodate the manual insertion of the locking saddle over the abutments.

Even though the surfaces 71, 75 are not in abutment, it will be appreciated that the locking saddle retains the abutments 65, 70 in their positions of FIGURE 6, and that the weight of the implement overhanging the frame 18a will tend to spread the abutments 65, 70 which spreading will be resisted by the locking saddle 80.

Since the foregoing description is to be considered exemplary rather than limiting, the true scope of the invention is that defined in the following claims.

I claim:
1. Means for interconnecting an implement mounted frame and a prime mover mounted frame in response to relative horizontal displacement of said frames; comprising
 a plurality of fixed laterally projecting pins on one of said frames, said pins being spaced relative to one another;
 a corresponding number of similarly spaced fixed notches on the other of said frames, said notches opening toward said pins in the direction of relative displacement and a fixed vertical abutment on said other frame adjacent to but spaced from each notch, respectively;
 a corresponding number of generally "L"-shaped pivot levers on said other frame, each of such levers being freely pivotal relative to the adjacent notch and each such lever having a central notch therein adapted to receive the corresponding pin, a normally vertically positioned arm overlapping the adjacent frame notch and horizontally aligned with the pin, a normally horizontally positioned arm underlying said corresponding pin, and an abutment on said horizontally positioned arm;
 relative horizontal displacement of said frames
  (1) initially contacting the vertically positioned arm of each pivot lever with the corresponding pin,
  (2) such contact upon further frame displacement relatively pivoting said lever to elevate the horizontally positioned arm of the pivot lever to confine the pin in the frame slot and in the lever notch, and
  (3) finally juxtaposing the pivot lever abutments and the adjacent frame abutments, respectively,
 and locking wedges engageable with the lever abutments and with the frame abutments, respectively, to secure said abutments in juxtaposition and said frames in assembly.

2. In a means for interconnecting a prime mover element and an implement element, a first frame on one of said elements having a plurality of laterally projecting spaced attachment pins, a second frame on the other of said elements having a plurality of correspondingly spaced fixed notches opening toward said pins, abutments on said second frame adjacent each of said notches, respectively, swingable generally "L"-shaped locking levers pivotally mounted on said second frame in spaced relation to said notches, respectively, said levers each being normally positioned to block the entry of said first frame pins into said notches and each such lever having an abutment cooperable with the corresponding first frame abutment and normally spaced therefrom, relative implement-prime mover movement after initial pin to lever contact moving said locking levers pivotally relative to said second frame to accommodate entry of said pins into said notches and to juxtapose the abutments on said first frame and on said levers, respectively, said levers each confining the corresponding pin in the adjacent notch, and U-shaped locking saddles telescopically movable over said juxtaposed abutments to secure said frames in assembly.

3. Means for interconnecting an implement mounted frame and a prime mover mounted frame in response to relative horizontal displacement of said frames, comprising a plurality of fixed laterally projecting attachment pins on one of said frames, said pins being spaced relative to one another;

a corresponding number of similarly spaced fixed brackets on the other of said frames, said brackets each having a recess opening toward said pins in the direction of relative displacement, a fixed vertical abutment spaced from each recess, and a pivot pin underlying each recess, respectively;

a corresponding number of pivot levers freely pivotal on each pivot pin, respectively, each of such levers being positioned gravitationally on its pivot pin to provide a normally vertically positioned abutment surface overlapping the adjacent frame notch and horizontally aligned with the adjacent attachment pin, and a normally horizontally positioned abutment underlying said corresponding attachment pin, relative horizontal displacement of said frames, (1) initially contacting the vertical abutment surface of each pivot lever with the corresponding attachment pin, (2) such contact upon further frame displacement relatively pivoting said lever from its gravitational position to elevate the horizontal abutment of the pivot lever to confine the attachment pin in the frame slot, and (3) finally juxtaposing the pivot lever horizontal abutments and the adjacent frame abutments, respectively, and U-shaped locking wedges engageable with the lever horizontal abutments and with the frame abutments, respectively, to secure said abutments in juxtaposition and said frames in assembly.

4. In a prime mover-implement connection, an implement frame having a plurality of laterally projecting spaced attachment pins, a prime mover frame having a plurality of correspondingly spaced notches opening toward said pins, abutments on said prime mover frame adjacent each of said notches, respectively, swingable generally "L"-shaped locking levers pivotally mounted on said prime mover frame in spaced relation to said notches, respectively, and said levers having notches therein adapted to receive said pins, said levers each having a pin contacting surface normally aligned with the corresponding pin and an abutment cooperable with said frame abutment and normally spaced therefrom, relative implement-prime mover movement after initial pin-to-surface contact moving said locking levers pivotally relative to said prime mover frame to position said pins in said notches of said frame and in the notches of said levers repectively, and to juxtapose the abutments on said prime mover frame and said levers, respectively, and U-shaped locking saddles telescopically movable over said juxtaposed abutments to secure said frames in assembly with the cooperable frame notches and lever notches receiving said pins, so that said pins are substantially completely peripherally surrounded by said frame and said levers, respectively.

References Cited by the Examiner
UNITED STATES PATENTS

| | | | |
|---|---|---|---|
| 2,376,539 | 5/1945 | Hitchcock et al. | 172—273 |
| 2,822,739 | 2/1958 | Altgelt | 280—461 X |
| 2,904,348 | 9/1959 | Quastad | 280—508 X |
| 2,910,307 | 10/1959 | Jennings | 280—508 X |
| 2,921,800 | 1/1960 | Donner et al. | 287—189.36 X |

HARRISON R. MOSELEY, *Primary Examiner.*

KENNETH DOWNEY, *Examiner.*